US009814011B2

(12) United States Patent
Belleschi et al.

(10) Patent No.: US 9,814,011 B2
(45) Date of Patent: Nov. 7, 2017

(54) CLUSTER BASED COMMUNICATION (71) Applicant: Telefonaktiebolaget L M Ericsson (publ), Stockholm (SE)

(72) Inventors: Marco Belleschi, Solna (SE); Hongwei Wang, Solna (SE); Leif Wilhelmsson, Dalby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 14/775,740

(22) PCT Filed: Mar. 14, 2014

(86) PCT No.: PCT/EP2014/055075
§ 371 (c)(1),
(2) Date: Sep. 14, 2015

(87) PCT Pub. No.: WO2014/140255
PCT Pub. Date: Sep. 18, 2014

(65) Prior Publication Data
US 2016/0014712 A1 Jan. 14, 2016

(30) Foreign Application Priority Data

Mar. 15, 2013 (EP) .................................... 13159502

(51) Int. Cl.
*H04W 48/16* (2009.01)
*H04W 60/04* (2009.01)
(Continued)

(52) U.S. Cl.
CPC .......... *H04W 60/04* (2013.01); *H04W 8/005* (2013.01); *H04W 48/16* (2013.01);
(Continued)

(58) Field of Classification Search
CPC ..... H04W 72/048; H04W 84/20; H04W 8/26; H04W 74/0833; H04L 45/04; H04L 65/1069
(Continued)

(56) References Cited

U.S. PATENT DOCUMENTS 6,493,759 B1 * 12/2002 Passman ................ H04W 84/20
455/446
2006/0126501 A1 6/2006 Ramaswamy
(Continued)

FOREIGN PATENT DOCUMENTS

CN 102291743 A * 12/2011
WO 2012158578 A1 11/2012

OTHER PUBLICATIONS

Fodor, G., et al., "Design Aspects of Network Assisted Device-to-Device Communications", IEEE Communications Magazine, Mar. 1, 2012, vol. 50, issue 3, pp. 170-177, IEEE.
(Continued)

*Primary Examiner* — Lester Kincaid
*Assistant Examiner* — Gary Lafontant
(74) *Attorney, Agent, or Firm* — Coats & Bennett, PLLC (57) ABSTRACT

A method of a wireless communication device comprised in a cluster of devices is disclosed. The devices of the cluster are associable with a cluster subscription identifier of a subscription providing communication between a network node and the cluster (based on a single identifier associated with the cluster) when one or more of the devices are in a cluster communication mode. The wireless communication device may have one of a cluster communication gateway role and a cluster internal communication role. The cluster communication gateway role comprises transmitting a cluster communication beacon signal, maintaining a communication link to the network node, and maintaining peer-to-
(Continued)

peer communication links to the other devices of the cluster. The cluster internal communication role comprises maintaining at least a peer-to-peer communication link to a specific device having the cluster communication gateway role. A received signal is scanned for a beacon signal and (if the beacon signal is found) it is determined, based on the cluster subscription identifier, whether the beacon signal is associated with the subscription. If the beacon signal is associated with the subscription, the identity of the specific device is determined based on the beacon signal, a cluster communication attach request is transmitted to the specific device, and a cluster communication attach response is received from the specific device. If the cluster communication attach response comprises a cluster communication attach acknowledgement, the wireless communication device transfers to the cluster communication mode and assumes the cluster internal communication role.

16 Claims, 4 Drawing Sheets (51) Int. Cl.
H04W 8/00 (2009.01)
H04W 64/00 (2009.01)
H04W 76/04 (2009.01)
H04W 88/04 (2009.01)

(52) U.S. Cl.
CPC ....... *H04W 64/006* (2013.01); *H04W 76/045* (2013.01); *H04W 88/04* (2013.01)

(58) Field of Classification Search
USPC .................................................. 455/446, 447
See application file for complete search history.

(56) References Cited

U.S. PATENT DOCUMENTS

2012/0083283 A1* 4/2012 Phan ................... H04W 72/048
455/450
2014/0010173 A1* 1/2014 Zakrzewski ............ H04W 8/26
370/329

OTHER PUBLICATIONS

Doppler, K., et al., "Device-to-Device Communication as an Underlay to LTE-Advanced Networks", IEEE Communications Magazine, Dec. 1, 2009, vol. 47, issue 12, pp. 42-49, IEEE.

Doppler, K., et al., "Advances in D2D Communications: Energy efficient Service and Device Discovery Radio", IEEE Second International Conference on Wireless Communication, Vehicular Technology, Information Theory and Aerospace & Electronic Systems Technology , Feb. 1, 2011, pp. 1-6, IEEE.

Baccelli, F., et al., "On the Design of Device-to-Device Autonomous Discovery", IEEE Fourth International Conference on Communication Systems and Networks (COMSNETS), Jan. 3, 2012, pp. 1-9, IEEE.

3rd Generation Partnership Project, "3rd Generation Partnership Project; Technical Specification Group Core Network and Terminals; Numbering, addressing and identification (Release 11)", Technical Specification, 3GPP TS 23.003 V11.5.0, Mar. 1, 2013, pp. 1-83, 3GPP, France.

Stelte, B., "An event management communication system for Wireless Sensor Networks",IFIP/IEEE International Symposium on Integrated Network Management (IM), May 23, 2011, pp. 630-633, IEEE.

* cited by examiner

CLUSTER BASED COMMUNICATION

TECHNICAL FIELD

The present invention relates generally to the field of wireless communication between a cellular communication network and wireless communication devices. More particularly, it relates to wireless communication between a cellular communication network and a cluster of wireless communication devices.

BACKGROUND

As the number of users and application scenarios of wireless communication increases, there will be an increasing demand on the supporting wireless communication networks (such as cellular networks) to accommodate a growing number of devices and to be able to simultaneously and satisfactorily serve these devices.

The capacity of an access point (e.g. an macro-eNodeB, a femto-eNodeB, a pico-eNodeB, etc. of a cellular network that operated according to the 3GPP UMTS LTE—Third Generation Partnership Program Universal Mobile Telecommunication Standard Long Term Evolution—standard) of a supporting wireless communication network in terms of the number of devices it can accommodate, is typically limited by the access point hardware (e.g. processing power, memory, etc.). Thus, in order to accommodate a growing number of devices, one may increase the number of access points and/or update the existing access point hardware. Such solutions may be cumbersome in terms of cost, implementation and physical deployment. Furthermore, there may be a desire to even further increase the number of devices that can be supported also after such solutions have been implemented.

Therefore, there is a need for alternative methods and devices that enable an increase in the number of devices that may be accommodated by an access point of a wireless communication network.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to obviate at least some of the above disadvantages and to provide alternative methods and devices that enable an increase in the number of devices that may be accommodated by an access point of a wireless communication network.

According to a first aspect, this is achieved by a method of a first wireless communication device comprised in a cluster of wireless communication devices comprising the first wireless communication device and one or more second wireless communication devices. The wireless communication devices of the cluster are associable with a cluster subscription identifier of a subscription providing communication between a network node of a cellular communication network and the cluster of wireless communication devices when one or more of the wireless communication devices are in a cluster communication mode. The communication is based on a single identifier associated with the cluster of wireless communication devices by the network node.

The first wireless communication device may have one of a cluster communication gateway role and a cluster internal communication role. The cluster communication gateway role comprises transmitting a cluster communication beacon signal, maintaining a communication link to the network node, maintaining peer-to-peer communication links to the one or more second wireless communication devices, forwarding communication from the network node to the one or more second wireless communication devices, and forwarding communication from the one or more second wireless communication devices to the network node. The cluster internal communication role comprises maintaining at least a peer-to-peer communication link to a specific one of the one or more second wireless communication devices, the specific wireless communication device having the cluster communication gateway role.

The method comprises scanning a received signal for a cluster communication beacon signal, and (if the cluster communication beacon signal is found) determining, based on the cluster subscription identifier, whether the cluster communication beacon signal is associated with the subscription.

If the cluster communication beacon signal is associated with the subscription, the method comprises determining an identity of the specific wireless communication device based on the cluster communication beacon signal, transmitting a cluster communication attach request to the specific wireless communication device, and receiving a cluster communication attach response comprising a cluster communication attach acknowledgement or a cluster communication attach non-acknowledgement from the specific wireless communication device. If the cluster communication attach response comprises a cluster communication attach acknowledgement, the method comprises transferring to the cluster communication mode and assuming the cluster internal communication role.

According to some embodiments, the single identifier may be a Cell Radio Network Temporary Identifier (C-RNTI) of a Third Generation Partnership Program Universal Mobile Telecommunication Standard Long Term Evolution (3GPP UMTS LTE) standard.

In some embodiments, the method may further comprise determining that a current geographical position of the first wireless communication device is comprised in an ensemble of approved geographical positions associated with the subscription. In some embodiments, this determination may be performed before scanning the received signal for the cluster communication beacon signal.

In various embodiments, different approaches may be applied regarding a determination of whether or not the cluster communication mode is potentially possible.

According to some embodiments, there is no specific geographical restriction associated with the cluster communication subscription (apart from the geographical restrictions normally seen in any cellular communication subscription). In such embodiments, the user of a wireless communication device may configure the device to attempt the cluster communication mode and in response thereto the device may start scanning the received signal for the cluster communication beacon signal. Thus, the detection of a cluster communication beacon signal will in itself be an indication of the device being in the proximity of a cluster.

According to other embodiment, there may be a specific geographical restriction associated with the cluster communication subscription (e.g. a collection of positioning coordinates, one or more cell coverage areas, or similar) to enable the cluster subscription to be valid only in a certain geographical area (e.g. a residence of the user, an office area, a mall, or similar). In such embodiments, the device may autonomously start to scan the received signal for the cluster communication beacon signal as soon as the certain geographical area is entered. Alternatively or additionally, the user may configure the device to attempt the cluster communication mode and the beacon scan may be performed in response thereto after it has been determined that the device is in the certain geographical area.

In some embodiments where there is a specific geographical restriction associated with the cluster communication subscription, a determination of whether or not the device is in the certain geographical area is only performed for devices requesting the cluster communication gateway role and not for devices performing the beacon scan.

If the cluster communication beacon signal is not found, or if the cluster communication beacon signal is not associated with the subscription, or if the cluster communication attach response comprises a cluster communication attach non-acknowledgement, the method may further comprise transmitting a cluster communication mode request to the network node and receiving a cluster communication mode response comprising a cluster communication mode acknowledgement or a cluster communication mode non-acknowledgement from the network node. If the cluster communication mode response comprises a cluster communication mode acknowledgement, the method may comprise transferring to the cluster communication mode and assuming the cluster communication gateway role.

If the cluster communication mode response comprises a cluster communication mode non-acknowledgement, the method may comprise remaining in a cellular communication mode. The cellular communication mode may be defined as a mode (or state, or similar—the terminology is not intended as limiting) where the first wireless communication device operates according to any legacy or future cellular communication standard. Using 3GPP UMTS LTE as an example, the cellular mode may comprise the states RRC_CONNECTED and RRC_IDLE.

In some embodiments, the method may comprise transmitting the cluster communication mode request to the network node and receiving the cluster communication mode response from the network node before the step of scanning the received signal for the cluster communication beacon signal. If the cluster communication mode response comprises a cluster communication mode acknowledgement, the method may then comprise transferring to the cluster communication mode and assuming the cluster communication gateway role. If the cluster communication mode response comprises a cluster communication mode non-acknowledgement, the method may comprise scanning the received signal for the cluster communication beacon signal.

The cluster communication attach request may comprise the cluster subscription identifier and the cluster communication attach acknowledgement may comprise the single identifier. The cluster communication mode request may comprise the cluster subscription identifier and the cluster communication mode acknowledgement may comprise the single identifier.

A second aspect is a method of a network node of a cellular communication network. The method comprises receiving a cluster communication mode request from a first wireless communication device comprised in a cluster of wireless communication devices comprising the first wireless communication device and one or more second wireless communication devices. The wireless communication devices of the cluster are associable with a cluster subscription identifier of a subscription providing communication (based on a single identifier associated with the cluster of wireless communication devices by the network node) between the network node and the cluster of wireless communication devices when one or more of the wireless communication devices are in a cluster communication mode. The cluster communication mode request comprises the cluster subscription identifier.

The method also comprises transmitting a cluster communication mode configuration request indicating the cluster subscription identifier to a core unit of the cellular communication network, and receiving a cluster communication mode configuration response comprising a cluster communication mode configuration acknowledgement or a cluster communication mode configuration non-acknowledgement from the core unit.

If the cluster communication mode configuration response comprises the cluster communication mode configuration acknowledgement, the method comprises transmitting a cluster communication mode response comprising a cluster communication mode acknowledgement to the first wireless communication device, and maintaining a communication link to the first wireless communication device.

The method may, in some embodiments, further comprise (if the cluster communication mode configuration response comprises the cluster communication mode configuration acknowledgement) assigning the single identifier to the cluster and including it in the cluster communication mode response.

According to some embodiments, the method may further comprise (before transmitting the cluster communication mode response) determining whether or not a current geographical position of the first wireless communication device is suitable for a wireless communication device having the cluster communication gateway role. The cluster communication mode response may comprise the cluster communication mode acknowledgement if the current geographical position of the first wireless communication device is suitable for a wireless communication device having the cluster communication gateway role and a cluster communication mode non-acknowledgement otherwise. This approach enables the network node to practice interference control for the cluster. For example, in relation to interference caused by and/or experienced from the cluster communication beacon signal, the network node may allow cluster communication gateway role and/or allocate beacon signals to minimize such interference.

The core unit may determine whether a current geographical position of the first wireless communication device is comprised in an ensemble of approved geographical positions associated with the subscription and, if so, transmit the cluster communication mode configuration response comprising the cluster communication mode configuration acknowledgement.

A third aspect is a computer program product comprising a computer readable medium, having thereon a computer program comprising program instructions. The computer program is loadable into a data-processing unit and adapted to cause execution of the method according to any of the first and second aspects when the computer program is run by the data-processing unit.

According to a fourth aspect an arrangement is provided of a first wireless communication device comprised in a cluster of wireless communication devices comprising the first wireless communication device and one or more second wireless communication devices. The wireless communication devices of the cluster are associable with a cluster subscription identifier of a subscription providing communication between a network node of a cellular communication network and the cluster of wireless communication devices when one or more of the wireless communication devices are in a cluster communication mode. The communication is based on a single identifier associated with the cluster of wireless communication devices by the network node.

The first wireless communication device may have one of a cluster communication gateway role and a cluster internal communication role. The cluster communication gateway role comprises transmitting a cluster communication beacon signal, maintaining a communication link to the network node, maintaining peer-to-peer communication links to the one or more second wireless communication devices, forwarding communication from the network node to the one or more second wireless communication devices, and forwarding communication from the one or more second wireless communication devices to the network node. The cluster internal communication role comprises maintaining at least a peer-to-peer communication link to a specific one of the one or more second wireless communication devices, the specific wireless communication device having the cluster communication gateway role.

The arrangement comprises a receiver, a transmitter, a beacon identifier and a controller.

The receiver is adapted to scan a received signal for a cluster communication beacon signal.

The beacon identifier is adapted to (if the cluster communication beacon signal is found) determine, based on the cluster subscription identifier, whether the cluster communication beacon signal is associated with the subscription. The beacon identifier is also adapted to (if the cluster communication beacon signal is associated with the subscription) determine, based on the cluster communication beacon signal, an identity of the specific wireless communication device.

The transmitter is adapted to (if the cluster communication beacon signal is associated with the subscription) transmit, to the specific wireless communication device, a cluster communication attach request.

The receiver is further adapted to (if the cluster communication beacon signal is associated with the subscription and in response to the transmitter transmitting the cluster communication attach request) receive, from the specific wireless communication device, a cluster communication attach response comprising a cluster communication attach acknowledgement or a cluster communication attach non-acknowledgement.

The controller is adapted to (in response to the receiver receiving the cluster communication attach acknowledgement) cause the first wireless communication device to transfer to the cluster communication mode and assume the cluster internal communication role.

According to some embodiments, the arrangement may further comprise a geographical positioner adapted to determine that a current geographical position of the first wireless communication device is comprised in an ensemble of approved geographical positions associated with the subscription. In such embodiments, the controller may be further adapted to cause the receiver to scan the received signal for the cluster communication beacon signal in response thereto.

In some embodiments, the transmitter may be further adapted to transmit, to the network node, a cluster communication mode request if the cluster communication beacon signal is not found, or if the cluster communication beacon signal is not associated with the subscription, or if the cluster communication attach response comprises a cluster communication attach non-acknowledgement. The receiver may be further adapted to (in response to the transmitter transmitting the cluster communication mode request) receive, from the network node, a cluster communication mode response comprising a cluster communication mode acknowledgement or a cluster communication mode non-acknowledgement. The controller may be further adapted to (in response to the receiver receiving the cluster communication mode acknowledgement) cause the first wireless communication device to transfer to the cluster communication mode and assume the cluster communication gateway role.

The controller may, according to some embodiments, be further adapted to (in response to the receiver receiving the cluster communication mode non-acknowledgement) cause the first wireless communication device to remain in a cellular communication mode.

A fifth aspect is a first wireless communication device comprising the arrangement of the fourth aspect.

In a sixth aspect an arrangement of a network node of a cellular communication network is provided. The arrangement comprises first and second receivers, first and second transmitters and a controller.

The first receiver is adapted to receive a cluster communication mode request from a first wireless communication device comprised in a cluster of wireless communication devices comprising the first wireless communication device and one or more second wireless communication devices. The wireless communication devices of the cluster are associable with a cluster subscription identifier of a subscription providing communication (based on a single identifier associated with the cluster of wireless communication devices by the network node) between the network node and the cluster of wireless communication devices when one or more of the wireless communication devices are in a cluster communication mode. The cluster communication mode request comprises the cluster subscription identifier.

The second transmitter is adapted to transmit (in response to the first receiver receiving the cluster communication mode request) a cluster communication mode configuration request indicating the cluster subscription identifier to a core unit of the cellular communication network.

The second receiver is adapted to (in response to the second transmitter transmitting the cluster communication mode configuration request) receive a cluster communication mode configuration response comprising a cluster communication mode configuration acknowledgement or a cluster communication mode configuration non-acknowledgement from the core unit.

The first transmitter is adapted to (in response to the second receiver receiving the cluster communication mode configuration acknowledgement) transmit a cluster communication mode response comprising a cluster communication mode acknowledgement to the first wireless communication device.

The controller is adapted to (in response to the second receiver receiving the cluster communication mode configuration acknowledgement) cause the network node to maintain a communication link to the first wireless communication device.

A seventh aspect is a network node comprising the arrangement of the sixth aspect.

In some embodiments, the fourth, fifth, sixth and seventh aspects may additionally have features identical with or corresponding to any of the various features as explained above for the first and second aspects respectively.

An advantage of some embodiments is that, since the cluster is perceived as a single wireless communication device (e.g. UE—User Equipment) by the network node, more wireless communication devices may be accommodated by the network node.

Another advantage of some embodiments is that increase of system performances (such as, for example, throughput and coverage) may be achieved in defined (typically limited) geographical areas. Further, interference (e.g. patterns and signal strengths) may be controlled and/or limited in the defined geographical areas.

Another advantage of some embodiments is that flexible management of a large variety of services may be provided.

Yet another advantage of some embodiments is that the end-to-end experience may be enhanced for users with a poor direct connection to the network. Furthermore, service may be provided even to users that are not capable of any direct connection to the network.

A further advantage of some embodiments is that power savings in wireless communication devices may be achieved, thus prolonging battery time.

BRIEF DESCRIPTION OF THE DRAWINGS

Further objects, features and advantages will appear from the following detailed description of embodiments, with reference being made to the accompanying drawings, in which.

DETAILED DESCRIPTION

In the following, embodiments will be described where a group of wireless communication devices (also simply referred to as devices herein) appear as a single device from the network perspective when the devices are in a cluster communication mode. This is achieved by the devices sharing a subscription identifier (e.g. as if they had identical SIM-cards). For example, the shared subscription identifier may be implemented in the 3GPP UMTS LTE standard by assigning an entire S-TMSI (System Architecture Evolution Temporary Mobile Subscriber Identity) code set to a single cluster subscription. Having a shared subscription identifier (and hence a shared subscription) facilitates for the devices to identify each other as belonging to the same cluster as will be seen in the following. One advantage with the approach is that the network node may accommodate more physical devices in total.

This new UE concept may be referred to as HOME-UE. Typically, a user may remove or add device members to the shared subscription.

It is noteworthy, that the HOME-UE concept is fully compatible with any legacy network based wireless communication, such as, for example, 3GPP UMTS; LTE. Each device may or may not, in addition, have a subscription identifier that is unique for that particular device (i.e. as in legacy approaches) and which is used for normal cellular communication when the device is in cellular communication mode. The two different types of subscriptions may be provided to a user jointly or separately.

The shared subscription identifier may be associated with a certain geographical area (or an ensemble of geographical positions), in which the subscription is valid for enabling the cluster communication. Such a geographical area may, for example, be defined by geographical coordinates, or by the coverage area of a cell or network node. For example, a user may have a shared subscription identifier that is valid in the geographical location of the residence of the user. In other examples, the geographical area may be an office space or a mall. When outside the certain geographical area, the device functions according to normal cellular communication procedures. A device may be associated with several cluster communication subscriptions. For example, one related to a residence geographical area, one related to an office geographical area, and one related to a favorite mall geographical area.

Since the devices share subscription identifier, they will be assigned the same cell identifier (e.g. C-RNTI) by a network node when they are in cluster communication mode. In fact, the network node will not realize that there may be several devices in the cluster, but merely assign a cell identifier in response to a received request. Thus, the number of devices that may be accommodated by the network node is increased since a C-RNTI (or similar) may be shared by all devices in a cluster.

When in cluster communication mode, a device may assume one of two roles: a cluster communication gateway role (also referred to as gateway role herein) and a cluster internal communication role (also referred to as internal role herein). An active cluster typically has at least one device having the gateway role at each moment in time, i.e. there may be more than one device having the gateway role simultaneously. Which device(s) has the gateway role may change over time as will be exemplified later herein.

In most aspects, a device that has the gateway role functions in relation to the network node as in normal cellular communication. Furthermore, it has peer-to-peer connections to the other devices of the cluster and forwards control and/or data between the other devices and the network node. The gateway role device also broadcasts a beacon signal to the other devices of the cluster. The beacon signal may be used for discovery (as will be exemplified later herein) and/or cluster synchronization. The beacon signal may, for example, be transmitted periodically. Furthermore, the transmission power used for the beacon may be configurable (e.g. by the operator) and/or dynamic to allow adjustment of the coverage area of the cluster.

A device that has the internal role only has peer-to-peer connections. At least one of the peer-to-peer connections is typically to a device that has the gateway role. Thus, all (or at least some of the) information which is provided by the network in cellular communication (e.g. time alignment, C-RNTI, physical channel configurations, etc.) is provided via other devices to a device that has the internal communication role.

The peer-to-peer communication (i.e. the communication method used within the cluster) may be according to any suitable known or future proximity based communication method. For example, device-to-device (D2D) communication—network assisted or not—may be used. Other examples include Bluetooth, WiFi direct, and other IEEE 802.11 variants. If a licensed spectrum is used for the pee-to-peer communication, some type of control (e.g. interference and scheduling) should typically be applied. D2D communication and some other proximity based communication methods are well known and the details will not be elaborated largely on herein.

Network assisted device-to-device communication will be considered as an example. In network assisted D2D communication, D2D capable devices in proximity of each other may establish a direct radio link—a D2D bearer—for communication and the network provides control and assistance e.g. by providing neighbor discovery services and radio-link control functionalities such as resource allocation, mode selection, power control schemes etc. Compared with many other peer-to-peer communication methods, the users of network assisted D2D communication may enjoy an interference-controlled environment that may allow very high bit rates, low delays and low power consumption.

Some elaboration on network assisted D2D communication is disclosed in F. Baccelli et al, "On the Design of Device-to-Device Autonomous Discovery", IEEE Fourth International Conference on Communication Systems and Networks (COMSNETS), January 2012, pp. 1-9; K. Doppler et al, "Advances in D2D Communications: Energy Efficient Service and Device Discovery Radio", IEEE Second International Conference on Wireless Communication, Vehicular Technology, Information Theory and Aerospace & Electronic Systems Technology (Wireless VITAE), February-March 2011, pp. 1-6; G. Fodor et al, "Design Aspects of Network Assisted Device-to-Device Communications", IEEE Communications Magazine, March 2012, vol. 50, issue 3, pp. 170-177; and K. Doppler et al, "Device-to-Device Communications as an Underlay to LTE-Advanced Networks", IEEE Communications Magazine, December 2009, vol. 47, issue 12, pp. 42-49.

Thus, communication can take place between the network node and several devices (all devices in a cluster) in an effective way using the same subscription. Downlink transmission (e.g. data, uplink scheduling grants, downlink scheduling assignment, control signaling, etc.) may be received and interpreted by multiple devices (either directly by the gateway role devices or indirectly by the internal role devices) and uplink transmission received by the network node may originate from several devices (either directly from the gateway role devices or indirectly from the internal role devices). Typically, the user-plane and the user-plane control are provided by the supporting network (e.g. a cellular network) according to some embodiments. For example, scheduling information and control signaling information may be provided by the network and exchanged between devices of a cluster via the peer-to-peer links. In various embodiments, the connection between the network node and the cluster may carry only control information (beacon information, scheduling information, interference information, etc.) or may also carry data.

Devices in a specified geographical area may recognize each other as belonging to the same cluster subscription as will be seen in the following. One or more devices may send a request for cluster communication to the network and the network (i.e. network node and/or core unit) may authenticate the subscription identifier as valid for cluster communication (and as valid in the current geographical area). The cluster organization may be autonomous or may be partly controlled by the network.

Figure 1:
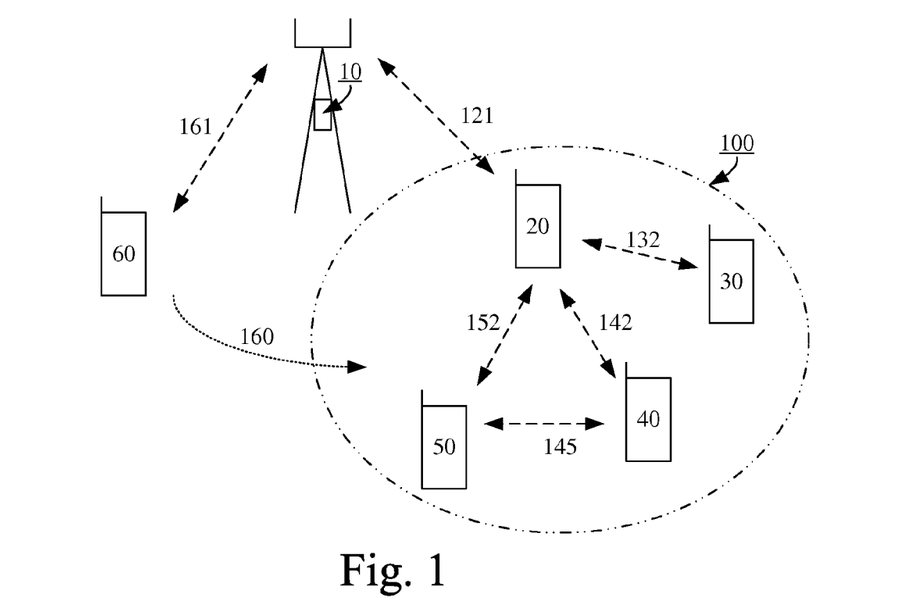
FIG. 1 is a schematic drawing illustrating a cluster of wireless communication devices according to some embodiments.

FIG. 1 illustrates a cluster communication situation according to some embodiments. The network node 10 is serving a geographical area 100 in which a cluster subscription is valid and the devices 20, 30, 40, 50, 60 share the cluster subscription identifier of that subscription.

In the situation illustrated in FIG. 1, the devices 20, 30, 40, 50 are already in cluster communication mode within the geographical area 100. The device 20 has the gateway role and communicates with the network node 10 via the cellular link 121. The devices 30, 40, 50 each have the internal role and communicate with the gateway role device 20 via the peer-to-peer links 132, 142, 152 respectively. The devices 40, 50 also have a direct peer-to-peer link 145 between them.

The network node 10 may perform various tasks related to the cluster to satisfy end-to-end performances, for example, authentication of the cluster subscription, maintenance of the link between the gateway device(s) and the network, assistance (e.g. scheduling, interference control, etc.) of peer-to-peer communication.

Since the device 60 is outside the geographical area 100 it cannot use the cluster communication mode and communicates with the network node 10 (or another network node) via the cellular link 161. If the device 60 moves to the geographical area 100 (as illustrated by the arrow 160), it may typically initiate a process to transfer to cluster communication mode. This process may commence by determining whether or not cluster communication is already set up based on the cluster subscription of the device 60. This may, for example, be accomplished by a beacon scan as will be exemplified in the following.

If the cluster communication is already set up, the device 60 may either attempt to assume the internal role by sending a corresponding request to the device 20 or attempt to assume the gateway role (either in parallel to or in place of the device 20) by sending a corresponding request to the network node 10. If one attempt is denied, the other role may be requested. If that is denied also, the device 60 remains in cellular communication mode.

If no cluster communication is already set up, the device 60 may attempt to assume the gateway role by sending a corresponding request to the network node 10. If the attempt is denied, the device 60 remains in cellular communication mode.

Figure 2:
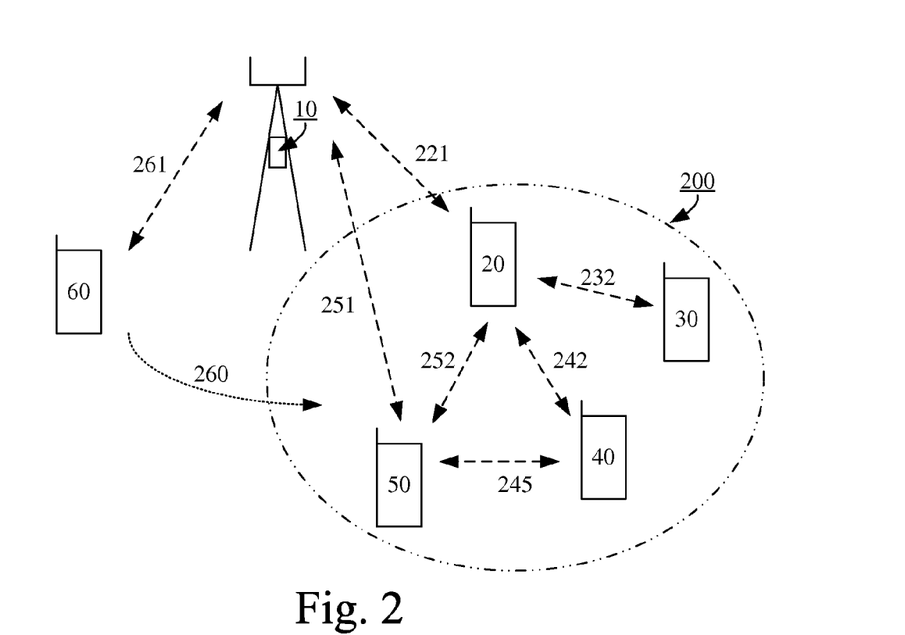
FIG. 2 is a schematic drawing illustrating a cluster of wireless communication devices according to some embodiments.

FIG. 2 illustrates a cluster communication situation according to some embodiments. The situation in FIG. 2 is very similar to that of FIG. 1, and only the differences will be elaborated on further. The network node 10 is serving a geographical area 200 in which a cluster subscription is valid and the devices 20, 30, 40, 50, 60 share the cluster subscription identifier of that subscription.

The devices 20, 30, 40, 50 are already in cluster communication mode within the geographical area 200. The devices 20 and 50 both have the gateway role and communicate with the network node 10 via the cellular links 221 and 251 respectively. The devices 30, 40 each have the internal role and communicate with at least one of the gateway role devices 20 and 50 via the peer-to-peer links 232, 242, 245 as applicable. The gateway role devices 20 and 50 also have a direct peer-to-peer link 252 between them.

The device 60 is outside the geographical area 200 and communicates with the network node 10 (or another network node) via the cellular link 261. If the device 60 moves to the geographical area 200 (as illustrated by the arrow 260), it may typically initiate a process to transfer to cluster communication mode in a similar manner as described in relation to FIG. 1.

Figure 3:
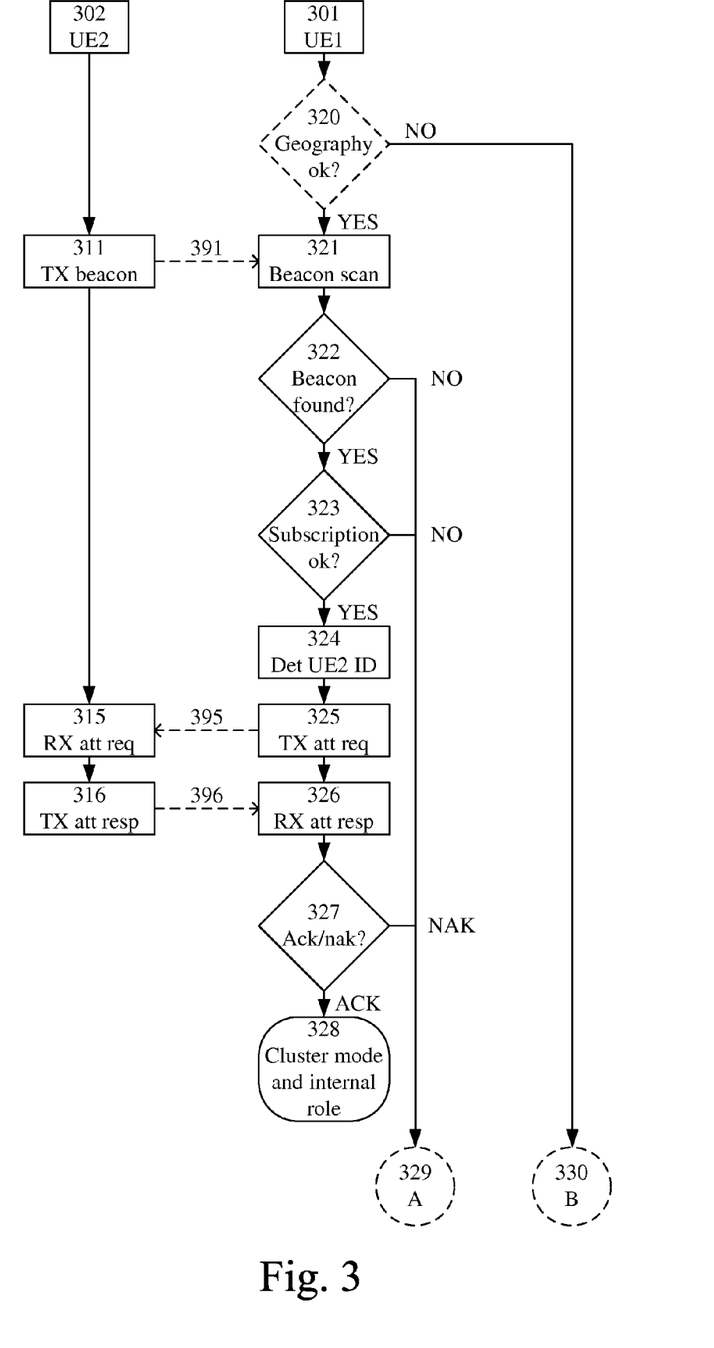
FIG. 3 is a flowchart illustrating example method steps according to some embodiments.

FIG. 3 illustrates example method steps that may be carried out by a first wireless communication device (UE1) 301 and a second wireless communication device (UE2) 302 according to some embodiments. For example, the first wireless communication device 301 may correspond to the device 60 of FIG. 1 or FIG. 2 and the second wireless communication device 302 may correspond to the device 20 of FIG. 1 or any of the devices 20 and 50 of FIG. 2.

Figure 4:
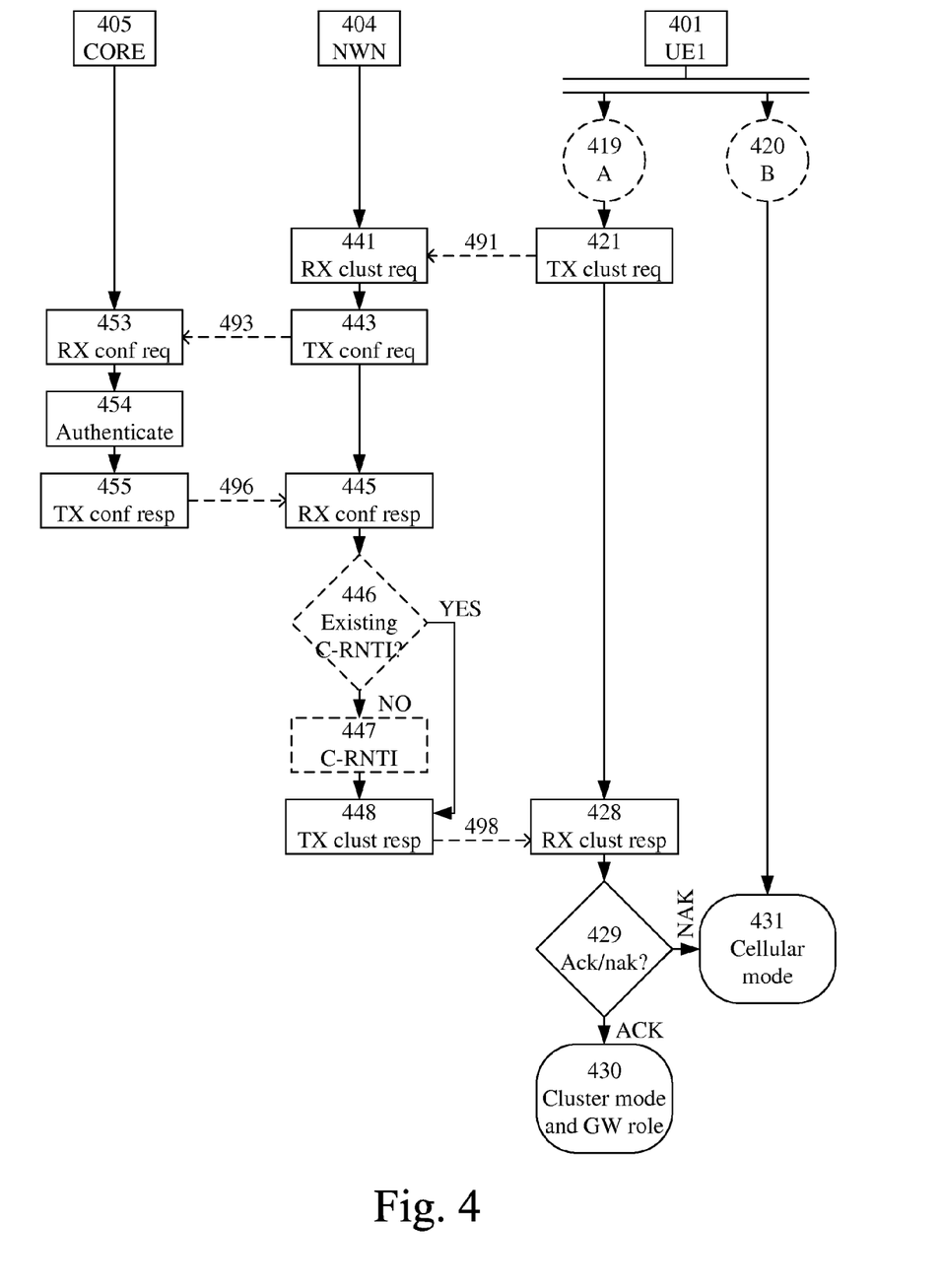
FIG. 4 is a flowchart illustrating example method steps according to some embodiments.

FIG. 3 and FIG. 4 (which will be elaborated on later herein) may be interconnected according to some embodiments by joining the connection points A (329 of FIG. 3 and 419 of FIG. 4) with each other and by joining the connection points B (330 of FIG. 3 and 420 of FIG. 4) with each other.

The method of the first device 301 commences when it desires to enter a cluster communication mode (for example, by performing a switch from a cellular communication mode).

In an example application, this is triggered by the first device entering a geographical area that is approved for cluster communication according to the cluster subscription, which is illustrated by step 320. If the first device 301 is not in a geographical area approved for cluster communication (NO-path out of step 320), then it typically remains in a cellular communication mode (or any other suitable mode) as illustrated by step 431 of FIG. 4 which is reached via the connection points B 330, 420.

If the first device 301 is in a geographical area approved for cluster communication (YES-path out of step 320), then the first device scans for possible beacon signals transmitted by a device having the gateway role as illustrated by step 321 and determines whether a beacon is found in step 322.

In various embodiments, the geographical area check illustrated by step 320 may be performed later in the method or may not be performed at all.

According to some embodiments, the user of the first device 301 may (at any time) configure the first device to attempt the cluster communication mode and in response thereto the first device may start the beacon scan of step 321 without performing step 320.

In some embodiments, the network may first verify that the first device is in a proximity to a gateway device (e.g. via positioning system information—such as GPS—and/or cellular system positioning references—such as current serving cell of the first device) before allowing it to start the beacon scan of step 321.

If there is a specific geographical restriction associated with the cluster communication subscription to enable the cluster subscription to be valid only in a certain geographical area, the first device may start the beacon scan of step 322 when the certain geographical area is entered as determined by step 320. Such a scenario may comprise the user configuring the first device to attempt the cluster communication mode—either before step 320 or after step 320 (e.g. as a response to the first device autonomously performing step 320 and prompting the user if the certain geographical area is entered)—or may comprise the first device autonomously performing both steps 320 and 321.

The determination in step 320 may be based on any suitable known or future geographical determination methods. Some examples include using a positioning system such as e.g. GPS—Global Positioning system, and/or positioning information available through the cellular communication system (e.g. current serving cell or similar). Likewise, the specific geographical restriction may be based on any suitable known or future geographical restriction parameters (e.g. positioning system parameters, and/or positioning information specified by the cellular communication system).

Furthermore, step 320 is illustrated in FIG. 3 as being performed by the first device, while it should be understood that in other embodiments some functions of step 320 may be performed by a network node and enable the first device to perform step 321 in response to detecting that the first device is in the certain geographical area.

If no beacon signal is detected (NO-path out of 322), e.g. because there is no second device 302 transmitting a beacon or for other reasons, the first device may try to assume the gateway role as will be elaborated on in connection to FIG. 4, illustrated by the connection point 329.

If a beacon signal 391—transmitted in step 311 by the second device 302 which has the gateway role—is detected (YES-path out of 322), the first device 301 determined whether or not the beacon signal 391 is associated with the cluster subscription as illustrated by step 323. This determination is typically based on a subscription identifier (which is the same for the first and the second device and is known to both devices). For example, the beacon signal 391 may comprise or otherwise be based on the subscription identifier (possibly encrypted) of the second device 302 and the determination of step 323 comprises comparing the subscription identifier of the beacon signal 391 with the subscription identifier of the first device 301 to determine if they coincide. For example, the comparison may comprise the first device 301 attempting to decrypt an encrypted subscription identifier using the key provided by the subscription of the first device and successful decryption is interpreted as the first and second devices having the same subscription.

A gateway device may typically broadcast its beacon periodically (e.g. using a low periodicity such as once per minute) using beacon resources it has been assigned by the network when its gateway role was acknowledged (compare with 498 of FIG. 4 that will be elaborated on later herein). In addition to the, possibly encrypted, cluster subscription identification (e.g. S-TMSI or other SIM-card related identification), the beacon may also comprise resource information for random access (e.g. PRACH). Any information of the beacon may have been communicated by the network node when the gateway role of the second device was acknowledged (compare with 498 of FIG. 4). The resources may be selected by the network node with the purpose to limit the interference within the cluster, towards other clusters and towards the ordinary cellular communication.

If the beacon signal 391 is not associated with the cluster subscription of the first device (NO-path out of 323), the first device may try to assume the gateway role as will be elaborated on in connection to FIG. 4, illustrated by the connection point 329.

If the beacon signal 391 is associated with the cluster subscription of the first device (YES-path out of 323), the first device may determine an identity of the device that transmitted the beacon (the second device 302) as illustrated by step 324. The determination may be based on the beacon signal 391 itself. For example, the beacon signal may comprise a device identifier of the second device 302 and step 324 may comprise reading the device identifier.

When the second device 302 has been identified by the first device 301 in step 324, the first device 301 transmits a cluster communication attach request 395 in step 325 which request is received by the second device 302 in step 315. The cluster communication attach request 395 may comprise the cluster subscription identifier of the first device 301. The cluster communication attach request 395 may be transmitted on resources (e.g. PRACH) defined in the beacon.

The second device 302 determines whether or not to grant the request (and register the first device 301 in the cluster) and transmits a cluster communication attach response 396 accordingly in step 316 which request is received by the first device 301 in step 326. The cluster communication attach response may comprise an acknowledgement or a non-acknowledgement depending on whether or not the second device 302 decided to grant the request, and the first device determines which in step 327. If the cluster communication attach response 396 comprises a non-acknowledgement (NAK-path out of 327), the first device may try to assume the gateway role as will be elaborated on in connection to FIG. 4, illustrated by the connection point 329.

If the cluster communication attach response 396 comprises an acknowledgement (ACK-path out of 327), the first device transfers to cluster communication mode and assumes the cluster internal communication role as illustrated by step 328.

The cluster communication attach acknowledgement may comprise a cell specific identifier (e.g. C-RNTI) that has been assigned to the cluster. The cluster communication attach acknowledgement may additionally comprise any other information (e.g. time alignment) that is required for the first device 301 to be able to communication with the second device 302, and/or information required for direct communication with the network node serving the second device 302. The direct communication with the network node may comprise the first device 301 receiving communication indicating an autonomous assignment by the network of the first device as gateway device as will be elaborated on further later herein. The second device may also allocate to the first device a dedicated identity and part of the resources available for peer-to-peer communications (e.g. UL scheduling request).

In step 328, the first device 301 is synchronized with the second device 302 and may use the allocated resources for peer-to-peer communications with the second device.

FIG. 4 illustrates example method steps that may be carried out by a first wireless communication device (UE1) 401 attempting to assume the gateway role, a network node (NWN) 404 and a network core unit (CORE) 405 according to some embodiments. For example, the first wireless communication device 401 may correspond to the device 60 of FIG. 1 or FIG. 2 and/or the first device 301 of FIG. 3, and the network node 404 may correspond to the network node 10 of FIG. 1 or FIG. 2.

As mentioned before, FIG. 3 and FIG. 4 may be interconnected according to some embodiments by joining the connection points A (329 of FIG. 3 and 419 of FIG. 4) with each other and by joining the connection points B (330 of FIG. 3 and 420 of FIG. 4) with each other.

Additionally or alternatively, some of the method steps of FIG. 4 may be executed before step 321 of FIG. 3 according to some embodiments. For example, the first device 301, 401 may try to assume the gateway role (compare with execution of steps 421, 428, 429 and 430) before scanning for beacons in step 321. If the gateway role is denied (compare with NAK-path out of step 429) the first device may start the beacon scan of step 321. Thus, in some embodiments, the first device starts to scan for an already existing cluster and in other embodiments, the first device starts with requesting the gateway role.

Returning to FIG. 4, the first device 401 commences in step 421 by transmitting a cluster communication mode request 491 which is received by the network node 404 in step 441. The cluster communication mode request 491 may comprise the cluster subscription identifier of the first device 401. In some embodiments, the cluster communication mode request 491 may also comprise an indication of the number of devices that can be potentially part of the cluster. The cluster communication mode request 491 may, for example, be comprised in signaling on dedicated resources (scheduled e.g. as periodically broadcast by the network in the SIB—System Information Block—of 3GPP UMTS LTE) or in PRACH—Physical Random Access CHannel—resources.

In embodiments where FIG. 4 is connected to FIG. 3 via connection points 419 and 420, step 421 is executed if one of the following event has occurred: no beacon signal was found (step 322), it was determined that the beacon signal was not associated with the subscription (step 323), or a non-acknowledgement was received (step 327).

In embodiments where there is a specific geographical restriction associated with the cluster communication subscription, a determination of whether or not the device is in the certain geographical area (compare with step 320 of FIG. 3) may be performed before step 421. This may be particularly typical if step 320 was absent when executing the steps of FIG. 3 and/or if the first device tries to assume the gateway role (execution of steps 421, 428, 429 and 430) before scanning for beacons.

The network node 404 transmits a cluster communication mode configuration request 493 in step 443 which request is received by the network code unit 405 in step 453. The cluster communication mode configuration request 493 indicates the cluster subscription identifier of the first device 401, and the network core unit 405 uses the cluster subscription identifier to authenticate the subscription in step 454. The network core unit 405 transmits a cluster communication mode configuration response 496 in step 455 which response is received by the network node 404 in step 445. The cluster communication mode configuration response 496 comprises an acknowledgement or a non-acknowledgement (e.g. depending on the result of the authentication of step 454). The authentication may, for example, comprise verifying that the cluster subscription is valid and possibly that a current geographical position (based on GPS coordinates, on which cell is serving cell, or similar) of the first device is within the geographical area where cluster communication is allowed according to the subscription.

If the cluster communication mode configuration response 496 comprises a non-acknowledgement, the network node 404 proceeds directly to step 448.

If the cluster communication mode configuration response 496 comprises an acknowledgement, the network node checks in step 446 whether or not a cell specific identifier (e.g. C-RNTI) is currently already assigned to the cluster (i.e. to the subscription). This may, for example, be the case if other devices with the same cluster subscription are already in cluster communication mode. If so (YES-path out of 446), the network node proceeds directly to step 448. If not (NO-path out of 446), the network node assigns a cell specific identifier in step 447 and proceeds to step 448 thereafter.

In step 448, the network node transmits a cluster communication mode response 498 which is received by the first device in step 428. The cluster communication mode response 498 comprises an acknowledgement or a non-acknowledgement (e.g. depending on the cluster communication mode configuration response 496 (if 496 is a NAK, then 498 is typically also a NAK) and on further considerations by the network node 404), and the first device 401 determines which in step 429. The further considerations may comprise a current amount of available resources and/or current interference patterns of the cell. In some embodiments, the network node may reserve a pool of resources for the cluster communication mode to avoid excessive interference towards other devices in ordinary cellular communication and/or towards neighboring cluster communication.

If the cluster communication mode response 498 comprises a non-acknowledgement (NAK-path out of 429), the first device typically remains in a cellular communication mode (or any other suitable mode) as illustrated by step 431.

If the cluster communication mode response 498 comprises an acknowledgement (ACK-path out of 429), the first device transfers to cluster communication mode and assumes the gateway role as illustrated by step 430. The cluster communication mode acknowledgement may comprise the cell specific identifier (e.g. C-RNTI) that has been assigned to the cluster. In some embodiments, the cluster communication mode acknowledgement may also comprise resource information (e.g. time, frequency, and/or code information) for, for example, communication between the network node and the first device when acting as a gateway device and/or beacon transmissions of the first device and/or beacon transmissions of other gateway devices of the cluster that the first device may need to detect. The resources may comprise PRACH resources and/or PBCH (Physical Broadcast CHannel) resources, and the allocation of such resources may typically take into account other cluster communication and the cellular traffic.

In some embodiments, the network node 404 can directly identify the cluster subscription (e.g. if the first device 401 is already camping in the cell in an RRC_CONNECTED state of 3GPP UMTS LTE and has already been assigned a C-RNTI) and does not need the core unit 405 to perform the authentication.

When the first device 301,401 transfers to cluster communication mode (regardless if it assumes the gateway role or the internal communication role), it may perform a synchronization to any device(s) that currently has the gateway role. The synchronization may be based on beacon signals and/or any other suitable signals transmitted by the gateway device(s) similarly to what has been described above in connection to FIG. 3.

A wireless device may decide to request the gateway role (compare with step 421 of FIG. 4) either when entering the cluster communication mode as described in connection to FIGS. 3 and 4 or when already in the cluster communication mode having the internal communication role. The decision regarding sending such a request may depend on one or more of:

- Whether or not another already existing gateway device is detected. If none is detected, the device typically requests the gateway role.
- Whether or not the device is in reach or out of reach of the network. If out of reach, the device typically does not request the gateway role.
- Battery charge level of the device. If battery charge level is low, the device typically does not request the gateway role, because the gateway role will involve handling requests and the like from other devices of the cluster and the battery drain will be faster than for the internal communication role.
- Power amplifier capabilities of the device. The device typically only requests the gateway role if it has a power amplifier capable of outputting high power levels.
- Antenna capabilities of the device. A device with an advanced antenna system (e.g. with antenna diversity, multiple-input multiple-output capability, or the like) is typically suitable for the gateway role.

The network may or may not grant a received request from a device to assume the gateway role (compare with step 448 of FIG. 4). Alternatively or additionally, the network may assign the gateway role to a device of the cluster without first having received any request from the device. The latter may be particularly relevant if the network discovers that a device is more suitable as gateway device than a current gateway device. When the network autonomously decides to assign the gateway role to another device, the network node typically sends (e.g. as part of an RRC-ConnectionReconfiguration message) a gateway role request to the device in question which replies (e.g. as part of an RRCConnectionReconfigurationComplete message) with an acknowledge or non-acknowledge in a gateway role response.

One or more of many considerations may be applied (in addition to subscription authentication and geographical check) when the network decides to grant a gateway role request and/or to autonomously assign the gateway role, for example:

- The geographical area covered by the cluster subscription. For example, large area may gateway devices that are capable of long range peer-to-peer-connections.
- The geographical position of the devices of the cluster. For example, a device close to the serving network node may be more suitable as a gateway device than a more distant device.
- The number of currently active devices in the cluster. For example, if many devices are active, the requirements on the gateway role device may increase and it is more important to choose a competent device.
- Power amplifier capabilities of the devices. A device that has a power amplifier capable of outputting high power levels is typically more suitable for the gateway role than other devices.
- Antenna capabilities of the devices. A device with an advanced antenna system (e.g. with antenna diversity, multiple-input multiple-output capability, or the like) is typically more suitable for the gateway role than other devices due to the possibility of higher transmitting/receiving gain.
- The admission control policy and/or scheduler of the network node. For example, the network node may limit the number of devices in the same cluster to mitigate complexity (e.g. of handling intra-cell interference for D2D communication with non-dedicated resources).
- The radio configuration of the devices. For example, some devices may only be capable of short range (peer-to-peer) communications, either by manufacture limitations or by end-user settings. Further, some devices may be "passive" devices with very limited transmission activity.
- The interference situation in the cluster.

In some embodiments, the network may decide to alternate the gateway role among some or all of the (suitable) devices in the cluster. Alternation may be uniform (e.g. using a round-robin approach) or may consider additional parameters (e.g. battery status of the devices if reported to the network, interference conditions, buffer status of the different members of the cluster, etc.).

As has been mentioned before, two or more devices within the same cluster may have the gateway role simultaneously according to some embodiments. In such situations, different resources may be assigned to different gateways to minimize interference within the cluster. The different gateway devices may be synchronized via a procedure similar to that of FIG. 3, with the exception that the internal communication role is not assumed in step 328.

If a device requests the gateway role and there is already one or more active gateway devices in the cluster, the network node may decide to grant or reject the new request. If rejected, the device starts its beacon scan to assume the internal communication role. The decision to reject or grant the request may be based on how many gateway devices are desired and on various other considerations as elaborated on above. For example, if the current gateway devices cannot satisfy the quality or service required, if the coverage is not good enough, or if the battery status of one or more of the current gateway devices is low, then it may be desirable to grant the new request.

In addition to the two cases already discussed (a device requesting to become a gateway device and the network autonomously deciding to appoint a device as gateway device—in stead of or in addition to other gateway devices), there is a third possibility of how to assign the gateway role to a device. According to this third possibility, a gateway device can assign the gateway role to another device (and either keep the gateway role itself also, or give it up). The C-RNTI and other information for communication with the network (e.g. transmission resources, PRACH resources, etc.) may be communicated by the old gateway device to the new gateway device as part of a synchronization procedure (compare with FIG. 3). Then, the new gateway device can perform a random access procedure towards the network node (including providing the C-RNTI to the network node) to acquire synchronization with the network.

Two typical communication strategies that may be used in association with the cluster communication concept will now be described, one where there is a single gateway device and one where there are two gateway devices in the cluster simultaneously, and it will be illustrated how the gateway device (or devices) communicates with the network node and how it communicates with and manages the other devices of the cluster.

In the situation with a single gateway device, the devices that are not a gateway device do not communicate with the network node directly, but leverage the information provided in the cluster communication mode attach response (compare with 396 of FIG. 3) to communicate with the gateway device. Information that may be needed for the peer-to-peer communication (e.g. for D2D: physical radio bearer, transmission power, time alignment, etc.) may be sent periodically from the gateway device to the other devices. The gateway device forwards data received from the network node to the proper device of the cluster. If a device which is not the gateway device desires to upload data to the network, it will send the data to the gateway device instead of sending a scheduling request to the network node. Then, the gateway device will send a scheduling request to the network node and request up-link scheduling resources.

In the situation with several gateway devices, the basic functionality is similar to the situation with a single gateway device, but it is possible to increase throughput, quality of service, and/or coverage by using the several gateway devices in a way that resembles a CoMP-based (Cooperative Multi-Point) scheme.

Typically, data from the network node will be received and forward to a non-gateway device via different gateway devices. All gateway devices are able to communicate with the network node at the same time, and they are all able to decode the PDCCH (Physical Downlink Control CHannel) info for the cluster (due to that they share the C-RNTI). Thus, all gateway devices receive the same signal from the network node. When the data is received at the gateway devices, there is a possibility to increase throughput compared to if a single gateway was used by letting different data go from different gateway devices to the target device via different peer-to-peer links. Alternatively or additionally, there is a possibility to increase the quality by using the redundancy provided by having data delivered to the target device via different gateway devices.

In an example scenario where a non-gateway device is to download data from the network, the down-link scheduling assignment for the device is transmitted via PDCCH but it is received and decoded by two different gateway devices. The two gateway devices will then receive and decode the corresponding transmitted PDSCH data based on the received scheduling info and forward the data to the non-gateway device transparently via the peer-to-peer links. The non-gateway device combines the data received from the respective gateway devices to get the final data decoded. Thereby, a diversity gain may be achieved at the non-gateway device.

Similarly, for data uploading from a non-gateway device to the network, the data will be sent to the gateway devices from the non-gateway device via peer-to-peer links and the gateway devices will be in communication with the network node (send scheduling requests and data to the network).

In an example scenario where a non-gateway device is to upload data to the network, the non-gateway device sends the data to two gateway devices. One of the gateway devices sends a scheduling request and the scheduling grant and resource allocation is read by both gateway devices. Then, the two gateway devices send the data to the network node. Typically, the data from the different gateway devices may be multiplexed in the assigned resources to achieve diversity gain at the network node.

Figure 5:
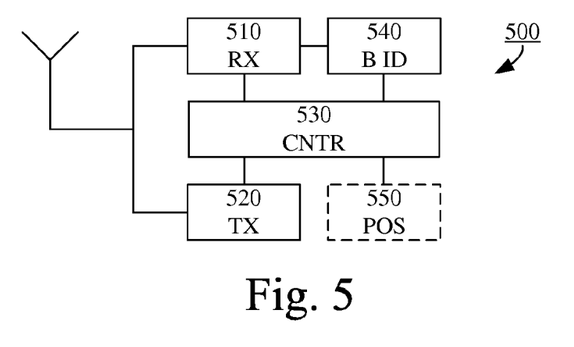
FIG. 5 is a block diagram illustrating an example arrangement according to some embodiments.

FIG. 5 illustrates an example arrangement 500 according to some embodiments. For example, the arrangement 500 may be comprised in a first device and may be adapted to carry out method steps illustrated in connection to the first device 301, 401 of FIGS. 3 and 4 respectively.

The arrangement comprises a receiver (RX) 510, a transmitter (TX) 520, a beacon identifier (B ID) 540, a controller (CNTR) 530, and optionally a geographical positioner (POS) 550.

The receiver 510 is adapted to scan a received signal for a cluster communication beacon signal (compare with step 321 of FIG. 3). The beacon identifier 540 is adapted to determine whether the cluster communication beacon signal is associated with the subscription (compare with step 323 of FIG. 3). The beacon identifier is also adapted to determine the identity of the specific wireless communication device (compare with step 324 of FIG. 3). The transmitter is adapted to transmit a cluster communication attach request (compare with step 325 of FIG. 3) and the receiver is further adapted to receive a cluster communication attach response (compare with step 326 of FIG. 3). The controller is adapted to cause the first wireless communication device to transfer to the cluster communication mode and assume the cluster internal communication role (compare with step 328 of FIG. 3) if an acknowledgement is received.

The geographical positioner may determine that a current geographical position is an approved geographical position associated with the subscription (compare with step 320 of FIG. 3), and the controller may cause the receiver to scan the received signal for the cluster communication beacon signal in response thereto.

The transmitter may also be adapted to transmit a cluster communication mode request (compare with step 421 of FIG. 4), the receiver may also be adapted to receive a cluster communication mode response (compare with step 428 of FIG. 4) comprising an acknowledgement or a non-acknowledgement, and the controller may cause the first device to transfer to the cluster communication mode and assume the cluster communication gateway role (compare with step 430 of FIG. 4) if an acknowledgement is received.

Figure 6:
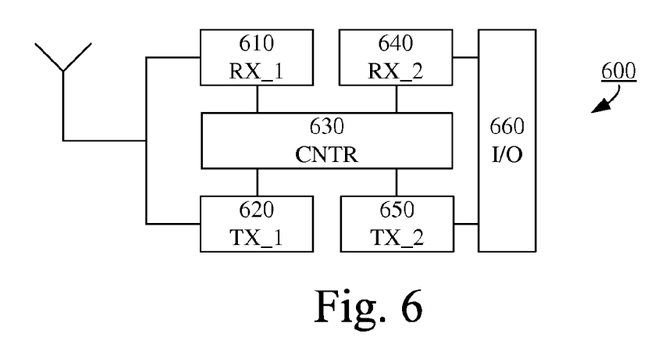
FIG. 6 is a block diagram illustrating an example arrangement according to some embodiments.

FIG. 6 illustrates an example arrangement 600 according to some embodiments. For example, the arrangement 600 may be comprised in a network node and may be adapted to carry out method steps illustrated in connection to the network node 404 of FIG. 4.

The arrangement comprises a first receiver (RX_1) 610, a second receiver (RX_2) 640, a first transmitter (TX_1) 620, a second transmitter (TX_2) 650, and a controller (CNTR) 630. The first receiver 610 and the first transmitter 620 are for communicating with wireless devices over an air interface while the second receiver 640 and the second transmitter 650 are for communicating with other network units (e.g. a core network unit) over a suitable interface (I/O) 660.

The first receiver 610 is adapted to receive a cluster communication mode request from a first device (compare with step 441 of FIG. 4) and the second transmitter 650 is adapted to transmit a cluster communication mode configuration request to a network core unit in response thereto (compare with step 443 of FIG. 4). The second receiver 640 is adapted to receive a cluster communication mode configuration response from the core unit (compare with step 445 of FIG. 4) and the first transmitter 620 is adapted to transmit a cluster communication mode response to the first device in response thereto (compare with step 448 of FIG. 4).

The controller 630 is adapted to cause the network node to maintain a communication link for cluster communication to the first device if the cluster communication mode response comprises an acknowledgement.

Through application of some embodiments, devices with low battery level and/or weak transmission/reception possibilities (e.g. poor antenna) may rely on better suited devices for communication with the network. Also more than one device may be relied on simultaneously to achieve diversity gain.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device) comprising circuitry/logic or performing methods according to any of the embodiments. The electronic apparatus may, for example, be a portable or handheld mobile radio communication equipment, a mobile radio terminal, a mobile telephone, a tablet, a base station, a base station controller, a pager, a communicator, an electronic organizer, a smartphone, a computer, a PC, a laptop, a smart-TV, a notebook, a USB-stick, a plug-in card, an embedded drive, or a mobile gaming device.

Figure 7:
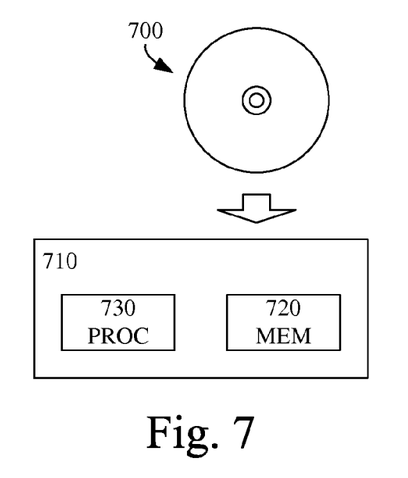
FIG. 7 is a schematic drawing illustrating a computer readable medium according to some embodiments.

According to some embodiments, a computer program product comprises a computer readable medium such as, for example, a diskette or a CD-ROM as illustrated by 700 of FIG. 7. The computer readable medium may have stored thereon a computer program comprising program instructions. The computer program may be loadable into a data-processing unit 730, which may, for example, be comprised in a mobile terminal 710. When loaded into the data-processing unit 730, the computer program may be stored in a memory 720 associated with or integral to the data-processing unit 730. According to some embodiments, the computer program may, when loaded into and run by the data-processing unit, cause the data-processing unit to execute method steps according to, for example, the methods shown in any of the FIGS. 3 and 4.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A method of a first wireless communication device, the first wireless communication device comprised in a cluster of cluster members comprising the first wireless communication device and one or more second wireless communication devices;

wherein at least one cluster member is in a cluster communication mode, the first wireless device is in a cellular communication mode, and each of the cluster members is associated with a shared cluster subscription identifier, the identifier associated with a subscription providing communication between a network node of a cellular communication network and one or more cluster members in a cluster communication mode; and wherein a cluster member in a cluster communication mode comprises one of:

a cluster communication gateway role comprising:
transmitting a cluster communication beacon signal;
maintaining a communication link to the network node;

maintaining peer-to-peer communication links to the one or more second wireless communication devices;
forwarding communication from the network node to the one or more second wireless communication devices; and
forwarding communication from the one or more second wireless communication devices to the network node; and
a cluster internal communication role comprising:
maintaining at least a peer-to-peer communication link to a gateway of the one or more second wireless communication devices, the gateway having the cluster communication gateway role; and
communicating indirectly via the gateway with the network node; and
the method comprising:
scanning, in a cellular communication mode, a received signal for a cluster communication beacon signal, wherein in a cellular communication mode the first wireless device communicates directly with the network node;
in response to the cluster communication beacon signal being found, determining whether the beacon signal is based on the shared cluster subscription identifier indicating that the beacon signal is associated with the subscription;
in response to the cluster communication beacon signal being associated with the subscription:
determining, based on the cluster communication beacon signal, an identity of the gateway;
transmitting, to the gateway, a cluster communication attach request;
receiving, from the gateway, a cluster communication attach response comprising a cluster communication attach acknowledgement or a cluster communication attach non-acknowledgement; and
in response to the cluster communication attach response comprising a cluster communication attach acknowledgement, transferring from the cellular communication mode to the cluster communication mode and assuming the cluster internal communication role.

2. The method of claim 1, wherein the cluster subscription identifier is a Cell Radio Network Temporary Identifier (C-RNTI) of a Third Generation Partnership Program Universal Mobile Telecommunication Standard Long Term Evolution (3GPP UMTS LTE) standard.

3. The method of claim 1, further comprising determining that a current geographical position of the first wireless communication device is in an ensemble of approved geographical positions associated with the subscription.

4. The method of claim 1, wherein:
the cluster communication attach request comprises the shared cluster subscription identifier;
the cluster communication attach acknowledgement comprises the shared cluster subscription identifier.

5. The method of claim 1, further comprising:
in response to any of: the cluster communication beacon signal being not found; the cluster communication beacon signal being not associated with the subscription;
and the cluster communication attach response comprising a cluster communication attach non-acknowledgement:

transmitting a cluster communication mode request to the network node;
receiving, from the network node, a cluster communication mode response comprising a cluster communication mode acknowledgement or a cluster communication mode non-acknowledgement; and
in response to the cluster communication mode response comprising a cluster communication mode acknowledgement, transferring from the cellular communication mode to the cluster communication mode and assuming the cluster communication gateway role.

6. The method of claim 5, further comprising, in response to the cluster communication mode response comprising a cluster communication mode non-acknowledgement, remaining in the cellular communication mode.

7. The method of claim 5, wherein the cluster communication mode request comprises the shared cluster subscription identifier.

8. A method of a network node of a cellular communication network, the method comprising:
receiving a cluster communication mode request from a first wireless communication device in a cellular communication mode, wherein:
a communication device in a cellular communication mode communicates directly with the network node;
the first wireless communication device is comprised in a cluster of cluster members, the cluster members comprising the first wireless communication device, and one or more second wireless communication devices in a cluster communication mode that is different than the cellular communication mode;
the wireless communication devices of the cluster are each associated with a shared cluster subscription identifier, the identifier associated with a subscription providing communication between the network node and the one or more cluster members in a cluster communication mode; and
the cluster communication mode request comprises the shared cluster subscription identifier;
transmitting a cluster communication mode configuration request indicating the shared cluster subscription identifier to a core unit of the cellular communication network;
receiving, from the core unit, a cluster communication mode configuration response comprising a cluster communication mode configuration acknowledgement or a cluster communication mode configuration non-acknowledgement;
in response to the cluster communication mode configuration response comprising the cluster communication mode configuration acknowledgement:
transmitting, to the first wireless communication device, a cluster communication mode response comprising a cluster communication mode acknowledgement indicating the first wireless communication device transfer from the cellular communication mode to the cluster communication mode in a gateway role; and
maintaining a communication link to the first wireless communication device that forwards, as part of the gateway role, to the network node communication from one or more cluster members.

9. The method of claim 8, wherein the communication link to the first wireless communication device is a communication link for receiving communications forwarded by the first wireless communication device from other wireless communication devices in the cluster attached to the cluster using an attachment procedure based on the shared cluster subscription identifier.

10. A computer program product stored in a non-transitory computer readable medium for handling communications with a first wireless communication device, the first wireless communication device comprised in a cluster of cluster members comprising the first wireless communication device and one or more second wireless communication devices; wherein:
  at least one cluster member is in a cluster communication mode, at least one cluster member is in a cellular communication mode, and each of the cluster members is associated with a shared cluster subscription identifier, the identifier associated with a subscription providing communication between a network node of a cellular communication network and one or more of the cluster members in a cluster communication mode; and
  a cluster member in a cluster communication mode comprises one of:
    a cluster communication gateway role in which the cluster member is configured to:
      transmit a cluster communication beacon signal;
      maintain a communication link to the network node;
      maintain peer-to-peer communication links to the one or more second wireless communication devices;
      forward communication from the network node to the one or more second wireless communication devices; and
      forward communication from the one or more second wireless communication devices to the network node; and
    a cluster internal communication role in which the cluster member is configured to:
      maintain at least a peer-to-peer communication link to a gateway of the one or more second wireless communication devices, the gateway having the cluster communication gateway role; and
      communicate indirectly via the gateway with the network node; and
  the computer program product comprising software instructions which, when run on one or more data processing circuits, causes the one or more data processing circuits to:
    scan, in a cellular communication mode, a received signal for a cluster communication beacon signal, wherein in a cellular communication mode the first wireless device communicates directly with the network node;
    in response to the cluster communication beacon signal being found, determine whether the beacon signal is based on the shared cluster subscription identifier indicating that the beacon signal is associated with the subscription;
    in response to the cluster communication beacon signal being associated with the subscription:
      determine, based on the cluster communication beacon signal, an identity of the gateway;
      transmit, to the gateway, a cluster communication attach request;
      receive, from the gateway, a cluster communication attach response comprising a cluster communication attach acknowledgement or a cluster communication attach non-acknowledgement; and
      in response to the cluster communication attach response comprising a cluster communication attach acknowledgement, transfer from the cellular communication mode to the cluster communication mode and assume the cluster internal communication role.

11. A computer program product stored in a non-transitory computer readable medium for controlling a network node of a cellular communication network, the computer program product comprising software instructions which, when run on one or more data processing circuits of the network node, causes the network node to:
  receive a cluster communication mode request from a first wireless communication device in a cellular communication mode, wherein:
    a communication device in a cellular communication mode communicates directly with the network node;
    the first wireless communication device is comprised in a cluster of cluster members, the cluster members comprising the first wireless communication device, and one or more second wireless communication devices in a cluster communication mode that is different than the cellular communication mode;
    the wireless communication devices of the cluster are each associated with a shared cluster subscription identifier, the identifier associated with a subscription providing communication between the network node and one or more of the cluster members in a cluster communication mode; and
    the cluster communication mode request comprises the shared cluster subscription identifier;
  transmit a cluster communication mode configuration request indicating the shared cluster subscription identifier to a core unit of the cellular communication network;
  receive, from the core unit, a cluster communication mode configuration response comprising a cluster communication mode configuration acknowledgement indicating the first wireless communication device transfer from the cellular communication mode to the cluster communication mode in a gateway role, or a cluster communication mode configuration non-acknowledgement;
  in response to the cluster communication mode configuration response comprising the cluster communication mode configuration acknowledgement:
    transmit, to the first wireless communication device, a cluster communication mode response comprising a cluster communication mode acknowledgement; and
    maintain a communication link to the first wireless communication device that forwards, as part of the gateway role, to the network node communication from one or more cluster members.

12. A first wireless communication device configured to operate in one of a communication gateway role, or a cluster internal communication role, in a cluster of cluster members comprising the first wireless communication device and one or more second wireless communication devices; wherein:
  at least one cluster member is in a cluster communication mode, the first wireless device is in a cellular communication mode, and each of the cluster members is associated with a shared cluster subscription identifier, the identifier associated with a subscription providing communication between a network node of a cellular communication network and the cluster when one or more of the cluster members are in a cluster communication mode; and
  a cluster member in a cluster communication mode comprises one of:

a cluster communication gateway role in which the cluster member is configured to:
  transmit a cluster communication beacon signal;
  maintain a communication link to the network node;
  maintain peer-to-peer communication links to the one or more second wireless communication devices;
  forward communication from the network node to the one or more second wireless communication devices; and
  forward communication from the one or more second wireless communication devices to the network node; and
a cluster internal communication role in which the cluster member is configured to:
  maintain at least a peer-to-peer communication link to a gateway of the one or more second wireless communication devices, the gateway having the cluster communication gateway role; and
  communicate indirectly via the gateway with the network node; and
the wireless communication device comprising:
a receiver;
a transmitter;
a beacon identifier; and
a controller circuit;
wherein the receiver is configured to scan, in a cellular communication mode, a received signal for a cluster communication beacon signal, wherein in a cellular communication mode the first wireless device communicates directly with the network node;
wherein the beacon identifier is configured to:
  in response to the cluster communication beacon signal being found, determine whether the beacon signal is based on the shared cluster subscription identifier indicating that the beacon signal is associated with the subscription; and
  in response to the cluster communication beacon signal being associated with the subscription, determine, based on the cluster communication beacon signal, an identity of the gateway;
wherein the transmitter is configured to, in response to the cluster communication beacon signal being associated with the subscription, transmit a cluster communication attach request to the gateway;
the receiver is further configured to, in response to the cluster communication beacon signal being associated with the subscription and in response to the transmitter transmitting the cluster communication attach request, receive, from the gateway, a cluster communication attach response comprising a cluster communication attach acknowledgement or a cluster communication attach non-acknowledgement; and
the controller circuit is configured to, in response to the receiver receiving the cluster communication attach acknowledgement, cause the first wireless communication device to transfer from the cellular communication mode to the cluster communication mode and assume the cluster internal communication role.

13. The first wireless communication device of claim 12, further comprising a geographical positioner configured to determine that a current geographical position of the first wireless communication device is in an ensemble of approved geographical positions associated with the subscription.

14. The first wireless communication device of claim 12, wherein:

the transmitter is further configured to transmit, to the network node, a cluster communication mode request in response to any of: the cluster communication beacon signal being not found, the cluster communication beacon signal being not associated with the subscription, and the cluster communication attach response comprises a cluster communication attach non-acknowledgement;
the receiver is further configured to, in response to the transmitter transmitting the cluster communication mode request, receive, from the network node, a cluster communication mode response comprising a cluster communication mode acknowledgement or a cluster communication mode non-acknowledgement; and
the controller circuit is further configured to, in response to the receiver receiving the cluster communication mode acknowledgement, cause the first wireless communication device to transfer from the cellular communication mode to the cluster communication mode and assume the cluster communication gateway role.

15. The first wireless communication device of claim 14, wherein the controller circuit is further configured to, in response to the receiver receiving the cluster communication mode non-acknowledgement, cause the first wireless communication device to remain in the cellular communication mode.

16. A network node of a cellular communication network, the network node comprising:
first and second receivers;
first and second transmitters;
a controller circuit;
wherein the first receiver is configured to receive, in a cellular communication mode, a cluster communication mode request from a first wireless communication device, wherein:
  a communication device in a cellular communication mode communicates directly with the network node;
  the first wireless communication device is comprised in a cluster of cluster members, the cluster members comprising the first wireless communication device and one or more second wireless communication devices in a cluster communication mode that is different than the cellular communication mode;
  the wireless communication devices of the cluster are each associated with a shared cluster subscription identifier, the identifier associated with a subscription providing communication between the network node and one or more of the cluster members in a cluster communication mode; and
  the cluster communication mode request comprises the shared cluster subscription identifier;
wherein the second transmitter is configured to transmit, in response to the first receiver receiving the cluster communication mode request, a cluster communication mode configuration request indicating the shared cluster subscription identifier to a core unit of the cellular communication network;
wherein the second receiver is configured to, in response to the second transmitter transmitting the cluster communication mode configuration request, receive, from the core unit, a cluster communication mode configuration response comprising a cluster communication mode configuration acknowledgement indicating the first wireless communication device transfer from the cellular communication mode to the cluster communication mode in a gateway role, or a cluster communication mode configuration non-acknowledgement;

wherein the first transmitter is configured to, in response to the second receiver receiving the cluster communication mode configuration acknowledgement, transmit, to the first wireless communication device, a cluster communication mode response comprising a cluster communication mode acknowledgement; and wherein the controller circuit is configured to, in response to the second receiver receiving the cluster communication mode configuration acknowledgement, cause the network node to maintain a communication link to the first wireless communication device that forwards, as part of the gateway role, to the network node communication from one or more cluster members.

* * * * *